Aug. 17, 1965     F. REINER ETAL     3,201,754

REMOTE CONTROL AND INDICATION SYSTEM

Filed May 10, 1962

FRED REINER
WAYNE S. LINFIELD
      INVENTORS

BY DONALD M. SANDLER
    THOMAS J. HOLDEN
        ATTORNEYS

# United States Patent Office 3,201,754
Patented Aug. 17, 1965

3,201,754
REMOTE CONTROL AND INDICATION SYSTEM
Fred Reiner, Pikesville, and Wayne S. Linfield, Baltimore, Md., assignors to Aircraft Armaments, Inc., Cockeysville, Md., a corporation of Maryland
Filed May 10, 1962, Ser. No. 193,840
1 Claim. (Cl. 340—147)

This invention relates to means for controlling and indicating the position of remotely operable relay switches.

It is sometimes necessary to selectively open or close an array of switches by remote control from a central control station, and to display there, an indication of each switch condition, for example, whether it is opened or closed. Often, the relay switches of remotely operable relays are utilized to provide the needed array. One of the problems attendant to the control and indication of the position of such relay switches is the amount of wire required to interconnect the remote station to the central station. Therefore, the primary object of this invention is to provide a system that minimizes the amount of such wire.

To achieve this, and other objects, the invention utilizes latching relays. For the purposes of this disclosure, a latching relay is a relay in which the relay switches are moved to either one of two positions depending upon the polarity of a current pulse through the relay coil. At the end of the current pulse, the position of the switches is maintained by a latching mechanism, which may be either mechanical or involve the use of a permanent magnet or other expedient.

Briefly, the invention utilizes an A.C. source of current for both control and indication purposes. For control purposes, a single wire connects the coil of each relay to the A.C. source, and means are provided for selectively applying to such coil, either the positive or negative halves of the A.C. current. Thus, the relay switches of a given relay move to one position when the positive halves of the current are applied to the relay coil, and move to the other position when the negative halves of the current are applied. This means that the polarity of the current passing through a single wire is capable of determining the position of the relay switches.

For indication purposes, an indicator actuatable by current flow only in one direction is identified with each relay, and a switch on each relay is used to complete a circuit that effects current flow in that direction when the switch is at one of its positions. By grouping the relays and indicators in pairs, and connecting each pair so that the direction of permissible current flow is in opposition, one wire can be used to connect the indicator pair in series with the relay switch pair and an A.C. current source. Thus, when the switches of each relay of a pair are properly positioned, opposite unidirectional current flows through the indicators while the single wire carries current in both directions.

Still other objects, features, and attendant advantages will become apparent to those skilled in the art from a reading of the following detailed description of several physical embodiments constructed in accordance with the invention, taken in conjunction with the accompanying drawings wherein.

Figure 1:
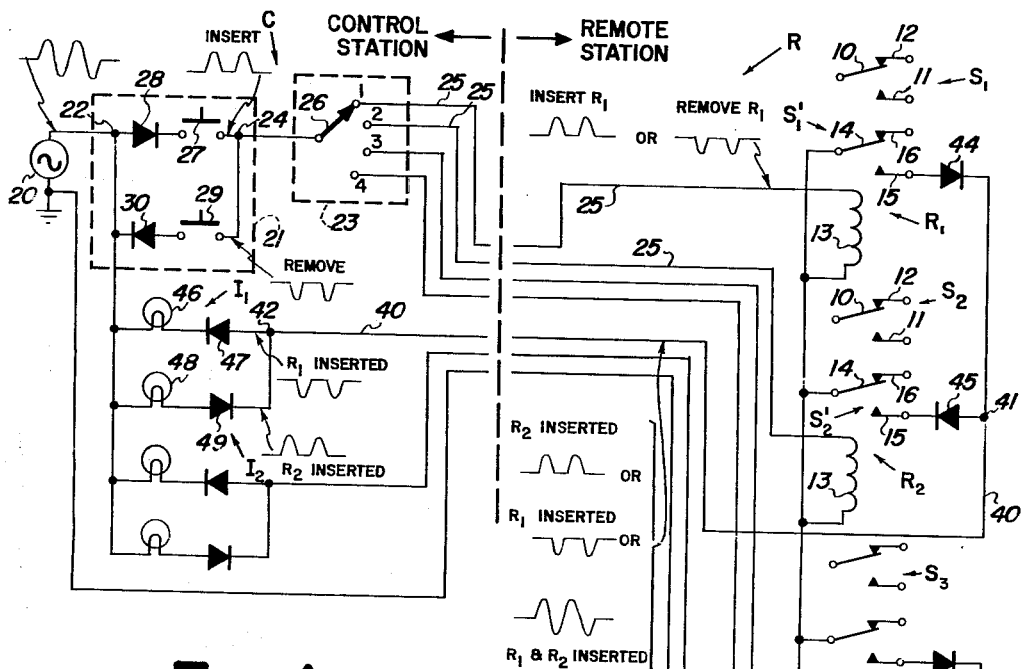
FIGURE 1 is a schematic representation of a central control station having an indicator for each of a plurality of relays at a remote station.

FIGURE 1 shows a control station C separate from a remote station R. Located at station R are a plurality of latching relays $R_1$, $R_2$, . . . . Associated with each relay is a network switch and an indicator switch so that at the remote station is an array of network switches $S_1$, $S_2$, . . . and an array of indicator switches $S_1'$, $S_2'$, . . . . The network switches constitute the switches that are a part of some circuit network (not shown) that is to be controlled remotely from station C.

Movable contactor 10 of each network switches $S_1$, $S_2$, . . . and movable contactor 14 of each indicator switches $S_1'$, $S_2'$, . . . are operably coupled so that both contactors of a relay are movable as a unit, and can have either of only two positions. When contactor 10 is engaged with a make-contact 11 to complete continuity in the circuit network, contactor 14 is engaged with make-contact 15 whereupon the relay is in what is termed "inserted" condition; and when contactor 10 is engaged with break-contact 12 to break continuity in the circuit network, contactor 14 is engaged with break contact 16 whereupon the relay is in what is termed "removed" condition. The condition of a relay is determined by the polarity of the currrent through coil 13 of each relay. Furthermore, due to the latching nature (not shown) of the relays, contactors 10 and 14 remain latched in either make or break contact position once moved thereto. Thus, a relay may be inserted or removed by controlling the polarity of a pulse of current delivered to its coil.

FIGURE 1 shows relays $R_1$, $R_2$, . . . in removed condition. The means by which the condition of the relays can be changed includes grounded A.C. source 20 connected to operating unit 21 at node 22, selector switch 23 connected to operating unit 21 at node 24, an operation wires 25 connecting coils 13 to selector switch 23.

Selector switch 23 controls which relay coil 13 is to be energized, and operating unit 21 controls the polarity of the current that energizes the particular coil. When movable contactor 26 of switch 23 is at position 1, unit 21 is connected to coil 13 of relay $R_1$. Likewise, at position 2, unit 21 is connected to coil 13 of relay $R_2$, etc.

To control polarity, unit 21 may take the form of a pair of polarized control switches connected in parallel with polarities in opposition. Preferably, each switch includes a push button in series with a diode. Insert button 27 and diode 28 are connected in series between nodes 22, 24 with the anode terminal of diode 28 at node 22; and remove button 29 and diode 30 are connected in series between the nodes with the cathode terminal of diode 30 at node 22.

The voltage at node 22 alternates in a positive and negative manner about ground potential. While only button 27 is depressed, the waveform at node 24 is a series of positive pulses because diode 28 conducts only on positive half cycles of the A.C. input. In like manner, while only button 29 is depressed, the waveform at node 24 is a series of negative pulses because diode 30 conducts only on the negative half cycles of the A.C. input. Thus, the direction of current through wire 25 depends upon which of the push buttons is depressed.

Figure 3:
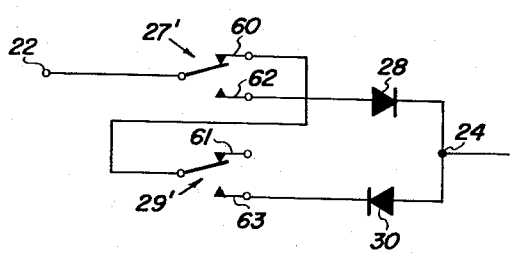
FIGURE 3 is a modified control unit showing polarized switches in which a lock-out feature prevents the application of A.C. current to a relay coil.

To prevent the application of the A.C. output of source 20 to node 24, which would occur were both insert button 27 and remove button 29 simultaneously depressed, a lock-out feature can be incorporated. Such feature could be mechanical in nature to prevent depression of one button during the time the other is depressed, or could take the form shown in FIGURE 3. Insert switch 27' is a single pole double throw switch in which the pole is biased into engagement with contact 60. Remove switch 29' is similar to switch 27' and the pole is biased into engagement with contact 61. FIGURE 3 shows the poles in their normal position. To insert a relay, the pole of switch 27' is depressed into engagement with contact 62 connecting node 22 to node 24 whereby diode 28 permits only the positive halves of the A.C. signal to appear at node 24. Where the pole of switch 29' depressed into engagement with contact 63 while the pole of 27' is depressed, it can be seen that there is no effect because contact 60 is disconnected from node 22. On the other hand, were the pole of switch 29' depressed into engagement with contact 63, node 22 would be connected to node 24 through diode 30 permitting only the negative halves of the A.C. signal to appear at node 24. Depression of the pole of switch 27' would serve to disconnect the source from node 24.

In the setup shown in FIGURE 1, a relay is inserted when the current through its coil is in the positive direction, and is removed when the current is in the negative direction. Thus, to insert relay $R_1$, contactor arm 26 is rotated to position 1 and button 27 is depressed. The resultant positive pulses of current passing through wire 25 cause contactors 10 and 14 to engage contacts 11 and 15 respectively. If button 27 is released, contactors 10 and 14 remain engaged with contacts 11 and 15 due to the latching nature of the relays. To move relay $R_1$, button 29 is depressed whereupon the resultant negative pulses in coil 13 cause contactors 10 and 14 to engage contacts 12 and 16 respectively. In this manner, the insertion or removal of a relay can be controlled using only one wire to connect the relay coil to the power source.

To provide an indication at the central station of relay condition, indicators $I_1$, $I_2$, . . . are used with indicator $I_1$ being identified with relay $R_1$, indicator $I_2$ being identified with relay $R_2$, etc. The means to indicate the condition of relays $R_1$ and $R_2$ can be understood by referring to FIGURE 2. Such means include: (1) a pair of polarized indicator switches $S_1'$, $S_2'$ connected in parallel with polarities in opposition; (2) a pair of polarized indicators $I_1$, $I_2$ connected in parallel with polarities in opposition; (3) a wire 40 connecting one end 41 of the pair of switches to one end 42 of the pair of indicators; (4) A.C. source 20 having one side connected to the other end 22 of the indicator pair; and (5) a ground connection between the other side of source 20 and the other end 43 of the pair of switches.

Switch $S_1'$ includes contactor 14, and make-contact 15 of relay $R_1$ in series with diode 44; and switch $S_2'$ includes contactor 14 and make-contact 15 of relay $R_2$ in series with diode 45. The cathode terminal of diode 44 and the anode terminal of diode 45 are connected to node 41; and contacts 14 of relays $R_1$ and $R_2$ are connected to node 43. Indicator $I_1$ includes lamp 46 in series with diode 47; and indicator $I_2$ includes lamp 48 in series with diode 49. The anode terminal of diode 47 and the cathode terminal of diode 49 are connected to node 42; and one side of each of lamps 46 and 48 are connected to node 22.

It can now be seen that polarized switch $S_1'$ is connected in series aiding with polarized indicator $I_1$ through wire 40; and that polarized switch $S_2'$ is connected in series aiding with polarized indicator $I_2$ through wire 40. Furthermore, the polarity of $S_1'$, $I_1$ combination is opposite to that of the $S_2'$, $I_2$ combination.

Figure 2:
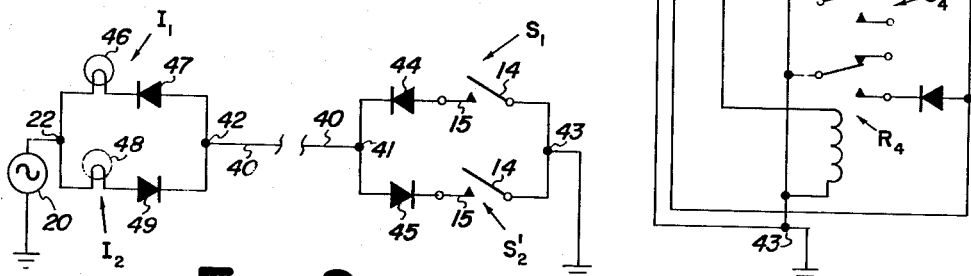
FIGURE 2 is a simplied schematic of a pair of indicators at the central control station associated with a pair of relays at the remote station.

FIGURES 1 and 2 show all relays in their removed condition; that is, all contactors 14 are out of engagement with make-contacts 15, and no indicator lamp is lit. When the operator inserts relay $R_1$, contactor 14 of relay $R_1$ engages contact 15 completing a circuit from source 20 through indicator $I_1$ and switch $S_1'$. Through each of the latter, current flows during each negative half of the A.C. cycle of source 20 and lamp 46 is lit. Since the cathode terminal of diode 49 is more positive than the anode terminal, this diode does not conduct and lamp 48 is not lit. Thus, lamp 46 indicates to the operator that relay $R_1$ is inserted.

If the operator now inserts relay $R_2$, contactor 14 of relay $R_2$ engages contact 15 completing a circuit from source 20 through indicator $I_2$ and $S_2'$. Current flows through the latter only during the positive half of the A.C. cycle of source 20 and lamp 48 is lit. It is believed apparent that current may flow in branches $I_1$ and $S_1'$ in only one direction which is opposite to the direction in which current may flow in branches $I_2$ and $S_2'$. However, in wire 40, current may flow in either direction. In this manner, an indication of the condition of a pair of relays can be attained on a pair of indicators using only one wire to connect the pair of relays to the pair of indicators.

It should be understood that the control unit is manually operable with the result that the most rapid depression and release of a button still provides a finite interval of time during which the switch is closed. Therefore, depending upon the frequency of the A.C. source, a number of half-cycles of current will be applied to a relay coil upon depression of a button. To obtain proper operation, the frequency of the A.C. source and its amplitude must be such that sufficient energy is delivered to the relay coil to cause it to operate. With these factors in mind, suitable operation of the system can be easily achieved.

What is claimed is:
A remote control and indicating system comprising:
(a) a pair of polarized control switches connected in parallel with polarities in opposition to form a control unit;
(b) a pair of relays each having a relay coil and a movable contactor that is engageable with one contact when the current through the coil is in one direction and engageable with another contact when the current through said coil is reversed;
(c) means for selectively connecting one end of said control unit to one end of either relay of said pair of relays;
(d) a source of A.C. potential;
(e) means connecting the other end of both the relay coils of said relays to one end of said source;
(f) means connecting the other end of said source to the other end of said control unit;
(g) a diode in series with each of said movable contractors and with one contact to define a pair of polarized switches;
(h) means connecting said polarized switches in parallel with said polarities in opposition to define a controlled unit;
(i) a pair of polarized indicators connected in parallel with polarities in opposition to define an indicator unit;
(j) a single wire connecting one end of said indicator unit to one end of said controlled unit;
(k) means connecting the other end of said indicator unit to said other end of said control unit; and
(l) means connecting the other end of said controlled unit to said one end of said source.

References Cited by the Examiner

UNITED STATES PATENTS

| 2,037,565 | 4/36 | Dozler | 340—176 |
|---|---|---|---|
| 2,203,888 | 6/40 | Ashworth | 317—150 |
| 2,250,214 | 7/41 | Ashworth | 340—252 |
| 2,971,135 | 2/61 | Ebert | 317—136 |

FOREIGN PATENTS

| 147,614 | 9/31 | Switzerland. |
|---|---|---|
| 130,916 | 12/32 | Austria. |
| 647,724 | 7/37 | Germany. |
| 203,276 | 6/39 | Switzerland. |
| 217,986 | 3/42 | Switzerland. |

OTHER REFERENCES

Principles and Methods of Telemetering by Borden et al., New York, Reinhold Publ. Corp., 1948, pp. 122, 123.

NEIL C. READ, *Primary Examiner.*